United States Patent
Vissers et al.

(10) Patent No.: US 10,790,534 B2
(45) Date of Patent: Sep. 29, 2020

(54) METHODS, DEVICES AND SYSTEMS TO ISOLATE SOLID PRODUCTS IN MOLTEN FLUID ELECTRODE APPARATUS

(71) Applicant: Vissers Battery Corporation, Wheaton, IL (US)

(72) Inventors: Daniel R. Vissers, Wheaton, IL (US); Manoel Tenorio, Brasilia (BR)

(73) Assignee: Vissers Battery Corporation, Wheaton, IL (US)

( * ) Notice: Subject to any disclaimer, the term of this patent is extended or adjusted under 35 U.S.C. 154(b) by 226 days.

(21) Appl. No.: 15/982,491

(22) Filed: May 17, 2018

(65) Prior Publication Data
US 2019/0356011 A1 Nov. 21, 2019

(51) Int. Cl.
| | |
|---|---|
| *H01M 4/38* | (2006.01) |
| *H01M 4/13* | (2010.01) |
| *H01M 10/02* | (2006.01) |
| *H01M 10/04* | (2006.01) |
| *H01M 10/0562* | (2010.01) |
| *H01M 10/39* | (2006.01) |
| *H01M 10/052* | (2010.01) |
| *H01M 4/02* | (2006.01) |

(52) U.S. Cl.
CPC ............ *H01M 10/04* (2013.01); *H01M 4/13* (2013.01); *H01M 10/02* (2013.01); *H01M 10/052* (2013.01); *H01M 10/0562* (2013.01); *H01M 10/3909* (2013.01); *H01M 2004/021* (2013.01)

(58) Field of Classification Search
CPC .. H01M 10/04; H01M 10/0562; H01M 10/02; H01M 10/3909; H01M 4/13; H01M 10/052; H01M 2004/021; H01M 4/368; H01M 10/39; H01M 10/4242; H01M 2300/0068; H01M 4/382; H01M 4/38
See application file for complete search history.

(56) References Cited

U.S. PATENT DOCUMENTS

| | | | |
|---|---|---|---|
| 4,584,251 | A | 4/1986 | Hunziker |
| 5,534,367 | A | 7/1996 | Kaun |
| 2009/0311603 | A1 | 12/2009 | Visco |
| 2010/0243017 | A1 | 9/2010 | Normann et al. |

(Continued)

FOREIGN PATENT DOCUMENTS

| | | |
|---|---|---|
| EP | 1723080 B1 | 6/2014 |
| FR | 2934087 | 7/2008 |

(Continued)

OTHER PUBLICATIONS

Thomas, Shane, International Preliminary Report on Patentability and Written Opinion, PCT/US2019/027339, The International Bureau of WIPO, dated Jul. 5, 2019.

(Continued)

*Primary Examiner* — Lisa S Park
(74) *Attorney, Agent, or Firm* — Gavrilovich, Dodd & Lindsey LLP; Charles D. Gavrilovich, Jr.

(57) ABSTRACT

A thermal battery includes a negative electrode and a positive electrode separated from the negative electrode by an electrolyte where at least the positive electrode is in a fluid state at the operating temperature of the battery. A solid product isolation system decreases the concentration of solid products within the fluid positive electrode at least within the region near the electrolyte.

21 Claims, 7 Drawing Sheets

(56) References Cited

U.S. PATENT DOCUMENTS

| | | | | |
|---|---|---|---|---|
| 2010/0330439 | A1* | 12/2010 | Halbert | B01J 10/007 |
| | | | | 429/409 |
| 2012/0171524 | A1 | 7/2012 | Hiraiwa et al. | |
| 2015/0226806 | A1 | 8/2015 | Kim et al. | |
| 2016/0156062 | A1 | 6/2016 | Littau et al. | |
| 2016/0365612 | A1 | 12/2016 | Bradwell et al. | |
| 2017/0365853 | A1* | 12/2017 | Visco | H01M 4/5815 |

FOREIGN PATENT DOCUMENTS

| | | | |
|---|---|---|---|
| JP | 2014229591 | | 12/2014 |
| WO | 20170143088 | | 8/2017 |
| WO | WO2017143088 | * | 8/2017 |
| WO | 2017147713 | | 9/2017 |
| WO | 2017152171 | | 9/2017 |
| WO | WO2017152171 | * | 9/2017 |

OTHER PUBLICATIONS

Thomas, Shane, International Preliminary Report on Patentability and Written Opinion, PCT/US2019/027344, The International Bureau of WIPO, dated Jul. 10, 2019.

Thomas, Shane, International Preliminary Report on Patentability and Written Opinion, PCT/US2019/027351, The International Bureau of WIPO, dated Jul. 30, 2019.

Thomas, Shane, International Preliminary Report on Patentability and Written Opinion, PCT/US2019/027354, The International Bureau of WIPO, dated Jun. 27, 2019.

Thomas, Shane, International Preliminary Report on Patentability and Written Opinion, PCT/US2019/027356, The International Bureau of WIPO, dated Jul. 10, 2019.

Thomas, Shane, International Preliminary Report on Patentability and Written Opinion, PCT/US2019/027359, The International Bureau of WIPO, dated Jul. 10, 2019.

* cited by examiner

METHODS, DEVICES AND SYSTEMS TO ISOLATE SOLID PRODUCTS IN MOLTEN FLUID ELECTRODE APPARATUS

FIELD

This invention generally relates to thermal batteries and more particularly to methods, devices, and systems for isolating solid products in fluid positive electrodes.

BACKGROUND

A battery generally includes a positive electrode (cathode), a negative electrode (anode) and an electrolyte. A battery typically includes current collectors within the electrodes that direct electrical current to the terminals of the battery. Attempts have been made to use fluids for electrodes where one or both of the electrodes are maintained in a fluid state by heating the electrode material. These batteries are sometimes referred to as thermal batteries or high temperature batteries and include, for example, devices sometimes referred to as liquid-metal batteries and rechargeable liquid-metal batteries.

BRIEF DESCRIPTION OF THE DRAWINGS

It is to be understood that the drawings are solely for purpose of illustration and do not define the limits of the appended claims. Furthermore, the components in the figures are not necessarily to scale. In the figures, like reference numerals designate corresponding parts throughout the different views.

DETAILED DESCRIPTION

Thermal batteries have several advantages over other types of batteries. The relatively low cost, high energy density, and high power density of thermal batteries (high temperature batteries) make these types of batteries highly attractive for several uses. Conventional thermal batteries, however, are limited in that solid products formed during discharge of the battery limit the depth of discharge of the battery. Ions of the negative electrode pass through the electrolyte and react with the positive electrode material to form product species. In many thermal batteries as the depth of discharge increases, these product species eventually include product species in a solid phase at the operating temperature of the battery. For example, in lithium sulfur thermal batteries, the lithium ions ($Li^+$) pass through the electrolyte and react with sulfur species to form reaction products that typically include several lithium polysulfide species ($Li_nS_m$), such as $Li_2S_2$, $Li_2S_4$, and $Li_2S_6$. These products are typically not in solid phase at the operating temperature of the battery. $Li_2S$, however, may also form and is in a solid phase at the operating temperature of the battery. The solid products continue to form as the depth of discharge of the battery increases and eventually reach a concentration that is high enough to "freeze" the battery. The concentration of the solid products near the electrolyte reduces ion flow and eventually reaches a point where ion flow ceases. In typical situations, the thermal battery is designed to limit the depth of charge so that the majority of the product species formed within the positive electrode are in a liquid phase. This is usually accomplished by limiting the amount of negative electrode material within the thermal battery. As a result, the energy stored in the thermal battery cannot approach its theoretical value.

In accordance with the techniques discussed herein, a solid product isolation system decreases the concentration of solid products within the fluid positive electrode at least within the region near the electrolyte. As a result, the battery can continue to be discharged and, in some situations, can continue until the electrode material is exhausted. As a result, the solid product isolation system extends the depth of discharge of the thermal battery. The resulting battery is more effective at fully using the positive electrode material than conventional batteries since the depth of discharge can be extended beyond that of conventional batteries. This can lead to improved performance in applications where energy is expended to move the thermal battery, such as in electric vehicle applications. For example, the range of an electric vehicle is increased by the solid isolation system since more energy is available from the same amount of positive electrode material. The solid products are reintroduced to the fluid positive electrode during the charging cycle of the battery.

For the examples discussed below, the positive electrode and the negative electrode are in a fluid state when the battery is at a temperature within an operating temperature range of the battery. In some implementations, however, the negative electrode may be in a solid state when the battery temperature is within the operating temperature range. In other words, only the positive electrode is in a fluid state while the other, negative electrode is solid within the operating temperature range. In some circumstances, the operating temperature range may include temperatures where both electrodes are fluid and temperatures where only one electrode is fluid.

Figure 1:
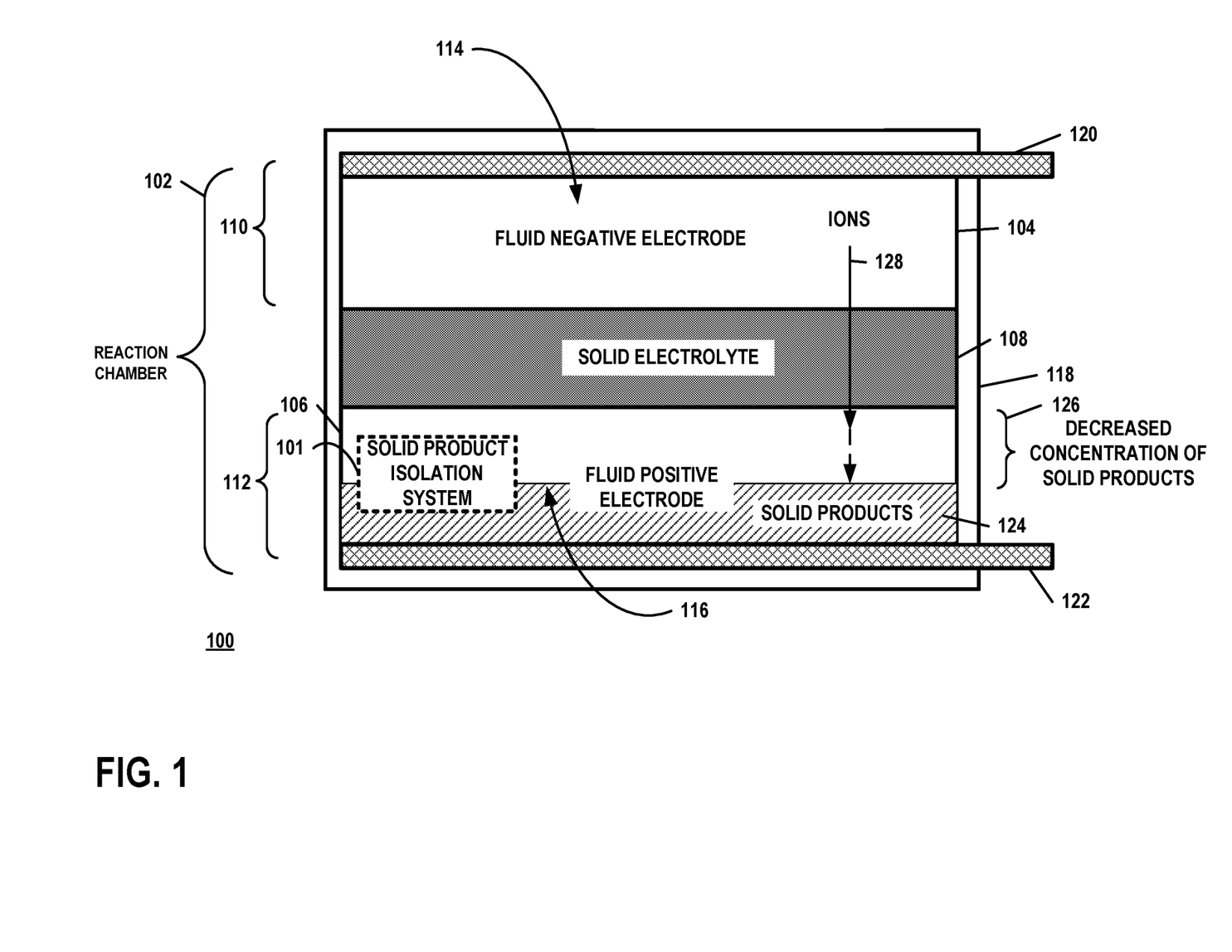
FIG. 1 is a block diagram of an example of a battery apparatus including a solid product isolation system that decreases the concentration of solid products in the fluid positive electrode at least within a region near the electrolyte.

FIG. 1 is a block diagram of an example of a battery apparatus 100 including a solid product isolation system 101 that isolates solid products. For the examples herein, the battery apparatus 100 includes a reaction chamber 102 having fluid electrodes 104, 106 separated by a solid electrolyte 108 where the solid product isolation system 101 decreases the concentration of solid products in the fluid positive electrode 106 at least within an adjacent electrode region near the electrolyte 108. The illustration in FIG. 1 depicts the general principles of the example and does not necessarily represent specific shapes, relative sizes, distances, or other structural details of the represented components. In some circumstances, the structures of two or more blocks may be implemented in a single component or structure. In addition, functions described as performed in a single block of FIG. 1 may be implemented in separate structures. The solid product isolation system is illustrated with a dashed line box to indicate that the system can be implemented outside of the reaction chamber, within the reaction chamber, or as part of the battery. Two examples of the solid product isolation system 101 are discussed below.

As discussed herein, a material is in a fluid state when the material has a consistency sufficiently liquefied to allow the material to flow from one area to another. In other words, the viscosity of a fluid material is such that the material can be directed, pumped, or can otherwise flow from one area to another. A fluid material may, however, have some components that are at least partially solid while others are in a liquid phase. As a result, a fluid material is not necessarily all in a liquid phase. As discussed herein, a material is in a non-fluid state where it is sufficiently solidified such that it cannot flow. In other words, the viscosity of the material in a non-fluid state is such that the material cannot be directed, pumped, or otherwise allowed to flow from one area to another. A non-fluid material, however, may have some components that are in a liquid phase as well as others that are in a solid phase. As referred to herein, a solid electrolyte is any material, mixture, compound, or other combination of materials that forms an electrolyte structure that is in a solid phase. Although the examples include a solid electrolyte, other types of electrolytes may be used in some situations with the discussed techniques. When a material is in the fluid state, it is fluid, and when a material is in the non-fluid state, it is non-fluid. For the examples discussed herein, the electrode materials are transitioned from a non-fluid state to a fluid state by heating and can be referred to as molten electrode materials and molten fluid electrode materials.

The battery apparatus 100 includes at least a reaction chamber 102 having a negative electrode region 110 and a positive electrode region 112 separated from the negative electrode region 110 by the solid electrolyte 108. The negative electrode region 110 contains a negative electrode material 114 and the positive electrode region 112 contains a positive electrode material 116. The battery 100 also includes a heating system 118 for sufficiently heating the positive and negative electrode materials in the reaction chamber 102 during operation. The electrode materials 114, 116 are maintained in a fluid state when the battery 100 is operating by heating the electrode materials 114, 116 while maintaining the solid electrolyte 108 is in a solid state. Accordingly, the operating temperature of the reaction chamber is below the melting point of the solid electrolyte 108. For the example of FIG. 1, the heating system 118 is an electrical heating system including one or more heating elements that facilitate the heating of the reaction chamber 102 to place and maintain the electrode materials 114, 116 in a fluid state. Other types of heating systems 118 can be used in some circumstances. The heating system heats the reaction chamber such that the negative electrode material 114 and the positive electrode material 116 are in a fluid state while the solid electrolyte 108 is maintained in a solid state.

The solid electrolyte 108 includes at least cations of the negative electrode material 114 and anions where the anion is selected to be relatively large and chemically stable with the materials within the reaction chamber 102. Some examples of negative electrode materials 114 include lithium, sodium, potassium, rubidium, and cesium. Some examples of simple anions include anions of chorine, bromine, and iodine. Other materials can be used in some circumstances, such as beta alumina and beta" alumina where the anions are more complex.

The fluid negative electrode material 114 in the negative electrode region 110 forms a fluid negative electrode 104 of the battery 100. The fluid positive electrode material 116 in the positive electrode region 112 forms a fluid positive electrode 106 of the battery 100. The fluid electrodes 104, 106 and the electrode materials may include more than a single element. A first current collector 120 is positioned within the fluid negative electrode 104 and second current collector 122 is positioned within the fluid positive electrode 106. With the properly placed current collectors 120, 122 within each electrode 104, 106, electrical energy can be harnessed from the electrochemical reaction occurring within the battery between the fluid negative electrode 104 and the fluid positive electrode 106 through the solid electrolyte 108. Therefore, the operation of the reaction chamber 102 in the example of FIG. 1 is similar to the operation of conventional thermal batteries except that the solid product isolation system 101 decreases solid products at least near the electrolyte 108.

During operation of the battery, products are formed within the positive electrode region 112. The products result from the reaction within the battery 100 and may include products in the liquid phase and solid phase 124. During the discharge of the battery, ions of the negative electrode material react with the positive electrode material to form the products. In conventional batteries, the concentration of solid products increases as the battery is discharged and eventually the concentration is high enough to halt operation of the battery. For the examples herein, however, the solid product isolation system 101 decreases the concentration of solid products within the fluid positive electrode at least within an adjacent electrode region 126 near the solid electrolyte 108. In accordance with one technique, the solid product isolation system 101 is implemented as part of the battery apparatus 100 where the structure and orientation of the apparatus results in the separation of the solid products from the remainder of the positive electrode material. With this first technique, the solid products are moved away from the electrolyte 108 but are still within the reaction chamber 102. As a result, the concentration of the solid particles is reduced in the adjacent electrode region 126 next to the electrolyte 108 although the overall volume of solid products in the fluid positive electrode region 112 is not decreased. In accordance with a second technique, the positive electrode material is removed from the positive electrode region, filtered to remove solid products, and then returned to the positive electrode region 112. With this second technique, the concentration of solid products is decreased within the entire positive electrode region 112.

The battery apparatus 100 may be implemented with different materials and electrochemical couples. For the examples discussed below, the negative electrode comprises lithium (Li) and the positive electrode comprises sulfur (S). The techniques discussed herein, however, may be applied to thermal batteries with other materials where solid products form during the discharge cycle. For example, the solid product isolation system 101 may be used with a sodium-sulfur (NaS) battery that includes a fluid negative electrode comprising sodium (Na) and a fluid positive electrode comprising sulfur (S). Further, the electrode materials may contain mixtures or compounds that include multiple elements in some circumstances. For example, in some liquid metal batteries, a molten mixture of sulfur and phosphorus (P) can be used for the fluid positive electrode.

During discharge of the battery apparatus 100, ions 128 of the negative electrode material 114 move through the solid electrolyte 108 to the positive electrode region 112. The ions 128 react with the positive electrode material 116, other products, and ions, to form products that may include solid products 124. Where the battery 100 is a lithium sulfur battery, for example, the reaction through the electrolyte will result is several different chemical species, such as $Li_nS_m$ where m is an integer equal to one or more. Therefore, several lithium polysulfide products ($Li_nS_m$) products, such as $Li_2S_2$, $Li_2S_4$, and $Li_2S_6$. may form. These polysulfide products are typically in a liquid state at the operating temperature of the battery 100. Di-lithium sulfide ($Li_2S$) which is solid at the operating temperature of the battery 100, however, may also form. Therefore, in a lithium sulfur battery, the solid product 124 that is formed is $Li_2S$.

For the examples discussed herein, the heating system 118 maintains the reaction chamber 102 at the appropriate temperature to facilitate the desired reaction between electrode materials and the solid electrolyte. Where the battery 100 is a lithium sulfur battery, the temperature of the negative electrode region 110 and the positive electrode region 112 is maintained at a temperature around 400 degrees Celsius (° C.). An example of a suitable solid electrolyte for such battery includes lithium iodide (LiI). Examples of LiS thermal batteries with a solid LiI electrolyte are discussed in U.S. patent application Ser. No. xx/xxx,xxx entitled "MOLTEN FLUID ELECTRODE APPARATUS WITH SOLID LITHIUM IODIDE ELECTROLYTE HAVING IMPROVED LITHIUM ION TRANSPORT CHARACTERISTICS", filed concurrently with the present application and expressly incorporated by reference, herein. The operating temperature may be based on several factors including the characteristics of the materials of the electrodes and solid electrolyte. For a lithium sulfur battery, some of the characteristics that can be considered include the melting point of lithium iodide, 469° C., the boiling point of sulfur, 444.6° C., and the eutectic melting point of lithium polysulfide products ($Li_nS_m$), 365° C. A temperature range that is above the eutectic melting point of lithium polysulfide products but below the melting point of LiI provides the temperature range of 365° C. to 469° C. that can be used in some circumstances. Maintaining the temperature below the boiling point of sulfur may be useful and provide a range of 365° C. to 444° C. that can be used in other circumstances. A suitable temperature range, however, includes temperatures between 375° C. and 425° C. The wider temperature range of 115.21° C. to 469° C. can also be used in still other situations. For the examples herein, the temperatures of the negative electrode region 110 and the positive electrode region 112 are maintained at approximately the same temperature. Among other advantages, such a scheme avoids a temperature gradient across the solid electrolyte 108. In some situations, however, the temperatures may be different between the electrode regions. Other temperature ranges and schemes can be used as long as the electrode materials are fluid and the electrolyte is solid. As a result, the temperature of the positive electrode region 112 should be above the melting point of sulfur, 115.21° C., and the negative electrode region 110 should be above the melting point of lithium, 180.5° C. for a lithium sulfur battery. While the operating temperature range may be different where other materials are used, the operating temperature is such that at least the fluid positive electrode is in the fluid state. Although the examples discussed herein reference lithium sulfur devices, the techniques can be applied to any combination of electrochemical couples in a thermal battery where solid products form in the fluid positive electrode.

One example where the solid product isolation techniques can be applied includes a sodium sulfur (NaS) battery. In such a battery where the operating temperature ranges from 300° C. to 350° C., $Na_2S$ and $Na_2S_2$ in a solid phase may form in the positive electrode during the discharge cycle of the battery. The amount of these solid products formed depends upon the depth of discharge of the NaS battery.

Figure 2:
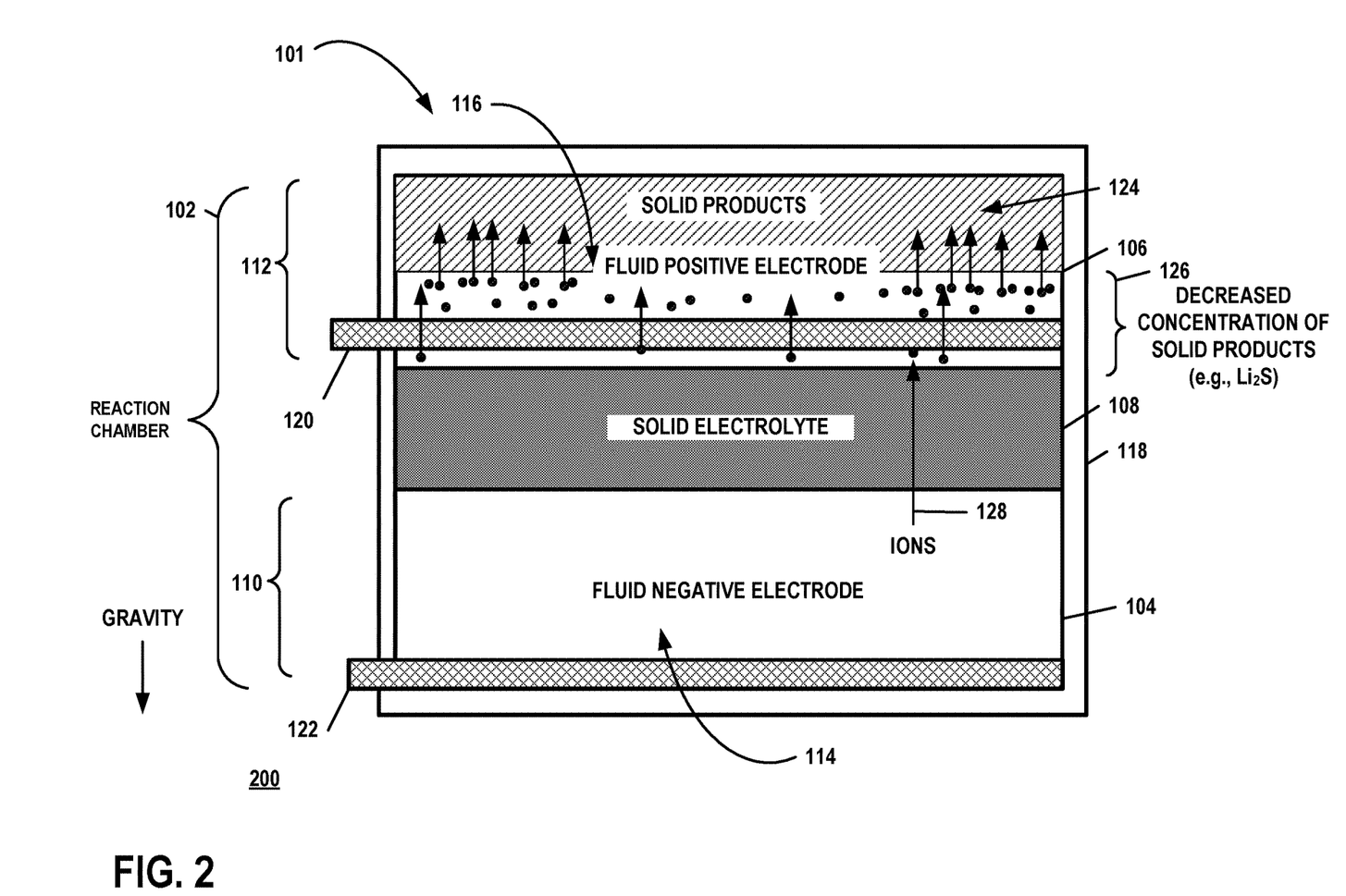
FIG. 2 is a block diagram of an example of a battery where the solid product isolation system is part of the battery.

FIG. 2 is a block diagram of an example of a battery 200 where the solid product isolation system 101 is part of the battery 200. The illustration in FIG. 2 depicts the general principles of the example and does not necessarily represent specific shapes, relative sizes, distances, or other structural details of the represented components. In some circumstances, the structures of two or more blocks may be implemented in a single component or structure. In addition, functions described as performed in a single block of FIG. 2 may be implemented in separate structures.

The battery 200 has a structure and orientation such that the solid electrolyte 108 is below the fluid positive electrode 106 and solid products float to the top of the positive electrode region 106 away from the electrolyte 108. During operation, the battery 200 has an orientation relative to Earth such that, if gravity is downward, the positive electrode region 112 is above the solid electrolyte 108. During discharge of the battery 200, the ions 128 of the negative electrode material 114 move through the solid electrolyte 108 to the positive electrode region 112. The ions 128 react with the positive electrode material, other products, and ions, to form products that may include solid products 124. Where the battery 200 is a thermal lithium sulfur battery, di-lithium sulfide ($Li_2S$) can form as well as other polysulfide products.

Due to the structure and orientation of the battery 200, the less dense solid products 124, such as $Li_2S$ in a thermal LiS battery, float to the top of the denser positive electrode material 116 (e.g., sulfur) which may contain other liquid products (e.g., polysulfide liquid products). In FIG. 2, the solid products 124 forming within the positive electrode region 112 are represented by black circles and the solid product 124 that is floating on top of the positive electrode material is represented by a rectangle with cross hatching. Arrows pointing up from the circles and opposite the direction of gravity indicate that the solid product 124 is moving to the top of the positive electrode region 112 and away from the electrolyte 108. As a result, the concentration of solid products 124 within the adjacent electrode region 126 near the electrolyte 108 is decreased. As the battery continues to discharge, additional solid products are formed and the size of the adjacent electrode region 126 decreases. As a result, a suitable position of the positive current collector 120 is near the electrolyte 108 so that it remains within the adjacent electrode region 126 deep into the discharge cycle. The positive current collector 120 has a configuration and position that allows the solid products to float to the top of the positive electrode region 112. For example, the positive current collection may be porous to allow the solid products 124 to pass.

Therefore, the solid product isolation system 101 of the example of FIG. 2 results from the structure and orientation of the positive electrode region and electrolyte. At least a portion of the electrolyte is below the positive electrode region 112 so that solid products 124 that form float away from the electrolyte 108 and do not restrict ion flow and battery operation.

Figure 3A:
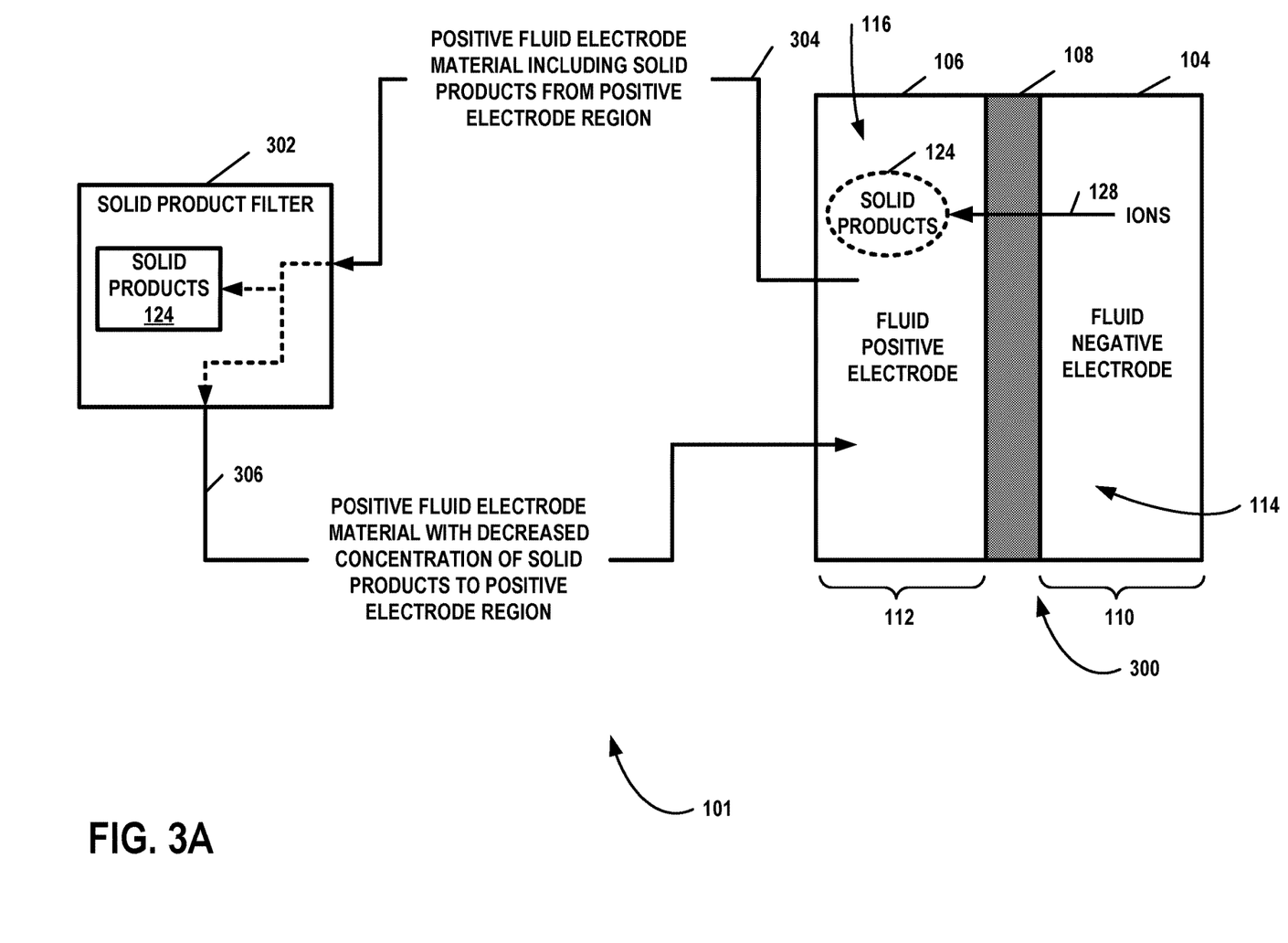
FIG. 3A is a block diagram of an example of a battery connected to the solid product isolation system where the solid product isolation system includes a solid product filter.

FIG. 3A is a block diagram of an example of a battery 300 connected to the solid product isolation system 101 where the solid product isolation system 101 includes a solid product filter 302. Therefore, the battery 300 of FIG. 3A is an example of the battery 100 of FIG. 1. As discussed above, ions 128 of the negative electrode material 114 form products, that may include solid products 124, within the positive electrode region by reacting with the positive electrode material 116. For the example of FIG. 3A, the fluid positive electrode material including solid products 304 is extracted from the positive electrode region 112 and processed by the solid product filter 302. The solid product filter 302 removes at least some of the solid products 124 from the fluid positive electrode material. The resulting fluid positive electrode material with decreased concentration of solid products 306 is directed back to the positive electrode region 112 of the battery 300. Accordingly, filtered fluid positive electrode material is returned to the positive electrode. The solid products are stored at the solid products filter until the battery 300 is charged. During the charging cycle, and the solid products 124 are introduced to the charged fluid positive electrode material extracted from the positive electrode region 112. The charged fluid positive electrode material reacts with the solid products 124 to form other positive electrode materials in a liquid phase. For example, in the thermal Li—S battery, the charged fluid positive electrode material may be $Li_2S_4$ that may react with two solid products, $2\,Li_2S$, to form three other positive electrode materials, $3\,Li_2S_2$ in a liquid phase. In doing so, the solid product transitions into a different positive electrode material in a liquid phase. The other positive electrode material is returned to the positive electrode region 112 where it is further charged by removing additional ions from the negative electrode material 116. The ions 128 move to the negative electrode region 110 through the electrolyte 108.

The solid product filter 302 may be implemented using different techniques. In one example discussed below with reference to FIG. 3B and FIG. 4, a vortex is created to drive the solid products to the center of the vortex where the products are extracted and stored. In another example, the solid product filter 302 includes a chamber where the solid products are allowed to float to the top of the chamber. The other fluid materials are pumped back to the positive electrode. In some situations, the solid products can be removed from the chamber by pumping or skimming the solid products away from the remainder of the material. In other situations, the solid products can remain in the chamber while the fluid material is extracted from the bottom of the chamber. In yet another example, the solid product filter uses a centripetal force induced by a rotating drum which drives the solid products to the center most position of the rotating material where the solid product can be skimmed away from the remainder of the material. The solid product is then stored for the charging cycle and the remainder of the material is circulated back to the positive electrode region for further discharge.

Figure 3B:
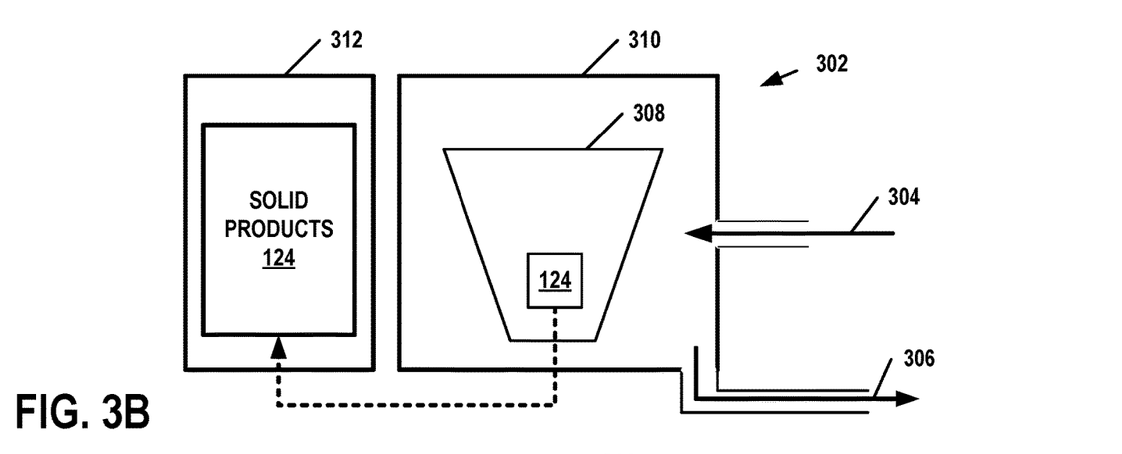
FIG. 3B is a block diagram of the solid products filter for an example where the solid products filter uses a vortex to isolate the solid products.

FIG. 3B is a block diagram of the solid products filter 302 for an example where the solid products filter 302 uses a vortex 308 to isolate the solid products 124. The vortex 308, formed in a primary chamber 310 of the filter 302, drives the solid products to a center. Solid products 124 are extracted from the center of the vortex moved to a secondary chamber 312 where the solid products 124 are stored until the battery 300 is charged.

Figure 3C:
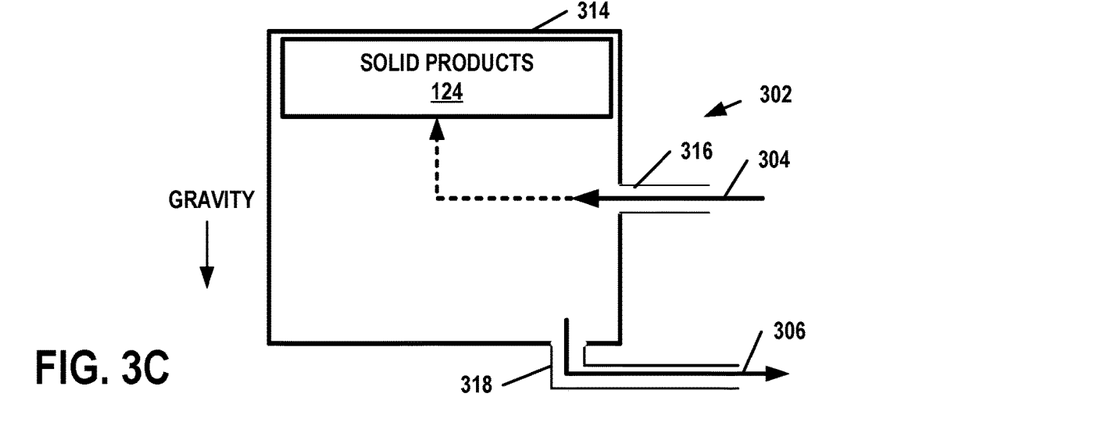
FIG. 3C is a block diagram of the solid products filter for an example where the solid products filter uses a gravity and density of solid products to isolate the solid products.

FIG. 3C is a block diagram of the solid products filter 302 for an example where the solid products filter 302 uses a gravity and density of solid products 124 to isolate the solid products 124. For the example of FIG. 3C, the solid products filter 302 has a separation chamber 314 that is configured to allow the less dense solid products to float to the top of the separation chamber 314 above the denser liquid positive electrode materials. The fluid positive electrode material including solid products 304 enters the separation chamber 314 through an input 316. For the example, the input 316 is positioned such that it is not near the bottom of the separation chamber 314 in order that incoming fluid positive electrode material does not contaminate the fluid material at the bottom of the chamber 314. The solid products 124 rise to the top of the chamber since the solid products are not as dense as the remaining liquid materials. As a result, the fluid positive electrode material with decreased concentration of solid products 306 at the bottom of the chamber can be extracted through an output 318 and directed back to the positive electrode region 112 of the battery 300. In some situations, the solid products 124 can be skimmed off the positive electrode material and moved to a storage chamber.

Figure 3D:
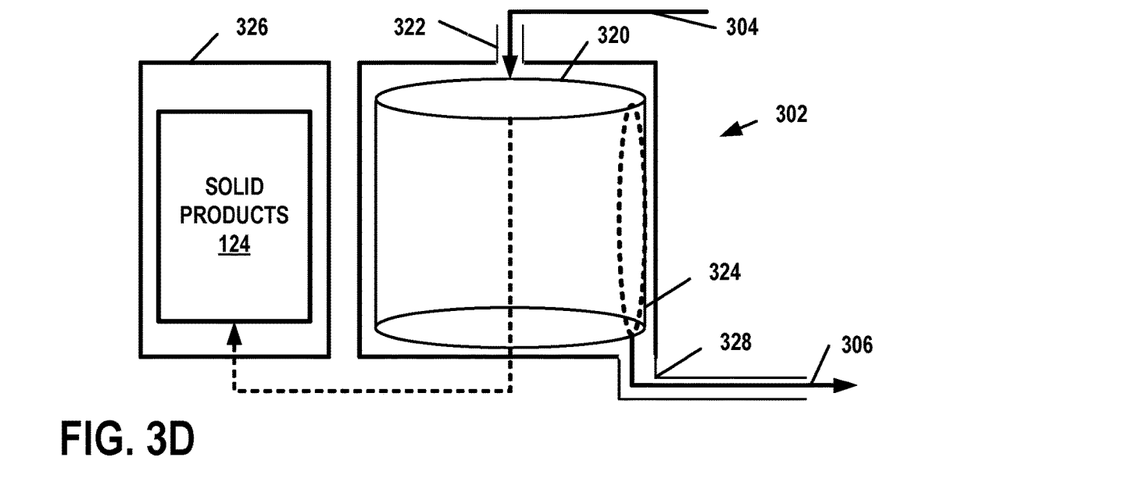
FIG. 3D is a block diagram of the solid products filter for an example where the solid products filter uses a rotating drum to isolate the solid products.

FIG. 3D is a block diagram of the solid products filter 302 for an example where the solid products filter 302 uses a rotating drum 320 to isolate the solid products 124. The rotating drum 302 rotates the fluid positive electrode material causing a centrifugal force of the material due to rotation of the material. The denser liquid materials move outward while the less dense solid products move to the center of the rotating drum 320. For the example, the input 322 is positioned such that it is not near the edge 324 of the rotating drum in order that incoming fluid positive electrode material does not contaminate the fluid material at the edge of the rotating drum 320. Solid products 124 are extracted from the center of the rotating drum 320 and moved to a secondary chamber 326 where the solid products 124 are stored until the battery 300 is charged. As a result, the fluid positive electrode material with decreased concentration of solid products 306 at the edge 324 of the rotating drum 320 can be extracted through an output 328 and directed back to the positive electrode region 112 of the battery 300.

Figure 4:
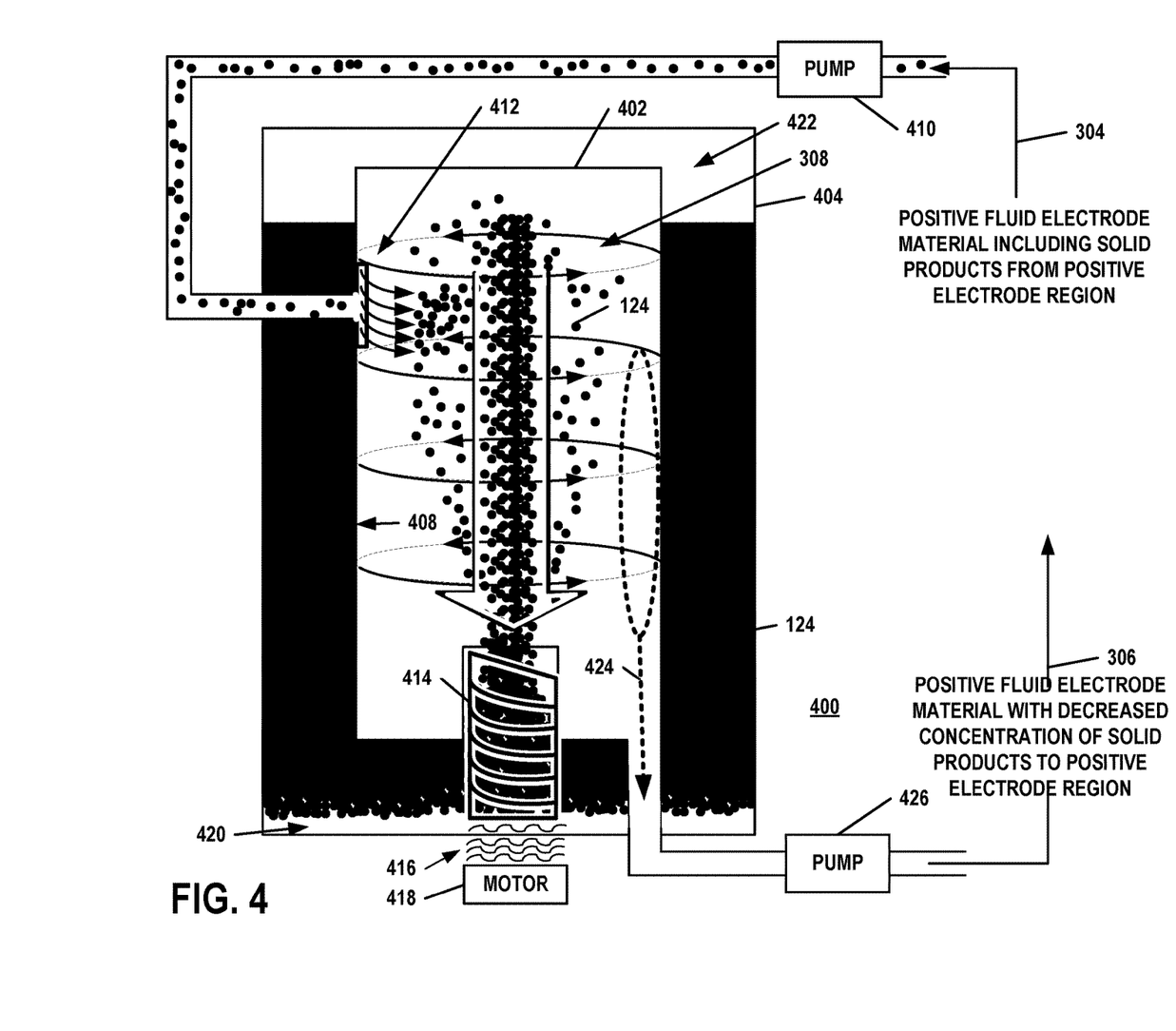
FIG. 4 is an illustration of an example of a vortex solid product separator.

FIG. 4 is an illustration of an example of a vortex solid product separator 400. The vortex solid product separator 400 of FIG. 4 is an example of the solid product filter 302 that uses a vortex 308 to isolate the solid products 124 discussed with reference to FIG. 3B. The vortex solid product separator 400, using a vortex, separates and removes at least some of the solid products 124 from the fluid positive electrode material extracted from the positive electrode region 112 of the battery 300. Accordingly, the vortex solid product separator 400 is an example of the solid product filter 302.

For the example herein, the vortex solid product separator 400 includes an inner chamber 402 within an outer chamber 404. The inner chamber 402 includes fluid positive electrode material with solid products 304 extracted from the positive electrode region of the battery 300. A vortex 308 drives the solid products 124 to the center of the vortex 308. For the example, the vortex 308 is created by laterally injecting the fluid positive electrode material with solid products 304 along an inner surface 408 of the inner chamber 402 at a sufficiently high pressure to spin the material 304 within the chamber 402. Although other techniques may also be suitable, a pump 410 extracts the fluid positive electrode material with solid products 304 from the positive electrode region 112 and injects it through a lateral injector 412 at the inner surface 408 of the inner chamber 402. The less dense solid products 124 move to the center of the vortex 308 as the denser liquid materials are forced to the outer portions of the vortex 308.

A solid product extractor 414 extracts the solid products 124 from the center of the vortex 308 and directs the extracted solid products 124 to the outer chamber 404. For the example of FIG. 4, the solid product extractor 414 is an Archimedes screw device that is magnetically coupled 416 to a motor 418. As the solid products 124 are directed into the outer chamber, it is possible small amounts of other liquid materials may also be present. As a result, a layer of liquid materials 420 may form at the bottom of the outer chamber 404. For the example, the volume of the outer chamber 404 is slightly greater than the maximum volume of solid product 124 that can be extracted from the battery during discharge. Therefore, at the beginning of the discharge cycle, the unused portion 422 within the outer chamber 404 will be relatively large and will decrease as more solid product 124 is guided into the outer chamber 404.

The fluid positive electrode material at the outer portions 424 of the vortex and near the inner surface 408 of the inner chamber 402 includes the least amount of solid product and, ideally, contains no solid products 124. The fluid positive electrode material 306 within this region 424 is extracted and returned to the positive electrode region 112 of the battery 300. An example of suitable technique for extracting the material 306 includes using a pump 426.

Figure 5:
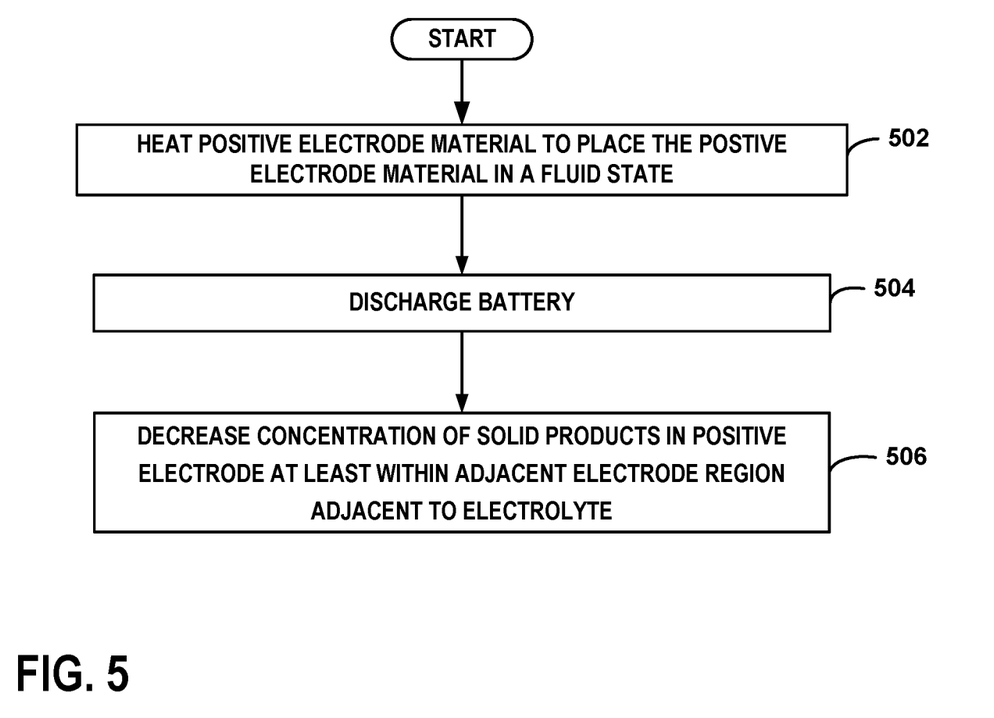
FIG. 5 is a flow chart of an example of a method of operating a fluid electrode battery.

FIG. 5 is a flowchart of an example of a method of operating a fluid electrode battery. The steps of FIG. 5 can be performed in a different order than shown and some steps may be combined into a single step. For example, step 504 and step 506 are typically performed simultaneously. Additional steps may be performed and some steps may be omitted. Although the method may be performed in any apparatus having the appropriate structure, components and materials, the example discussed with reference to FIG. 5 is performed in a thermal battery, such as batteries 100, 200, 300 discussed above.

At step 502, a positive electrode material is heated to place and maintain the positive electrode material in the positive electrode region of the reaction chamber in a fluid state. By adequately heating the positive electrode region of the reaction chamber, a fluid positive electrode is formed from the heated positive electrode material. For the example herein, the negative electrode material is also heated to place and maintain the negative electrode material in the negative electrode region of the reaction chamber in a fluid state. Accordingly, the reaction chamber is heated such that the electrode materials are fluid.

At step 504, the battery is discharged. During the discharge cycle, the battery is typically being used to supply electrical energy by connecting an electrical load to the current collectors. As discussed above, solid products form in the fluid positive electrode due to ions of the negative electrode region moving through the electrolyte and reacting with positive electrode material.

At step 506, the concentration of solid products is reduced in the positive electrode region at least within the adjacent electrode region that is adjacent to the electrolyte. As discussed above, one technique includes using gravity and the relative densities of the solid products to separate the solid products from the rest of the positive electrode material. The orientation and structure of the battery is such that the solid products float away from the electrolyte. In other techniques, the positive electrode material with solid products is extracted and processed by a solid products filter. The positive electrode material with decreased solid product concentration is directed to the positive electrode region of the battery. An example of a suitable technique for use by the solid product filter includes using a vortex to separate the solid products from the remainder of the positive electrode material.

Figure 6:
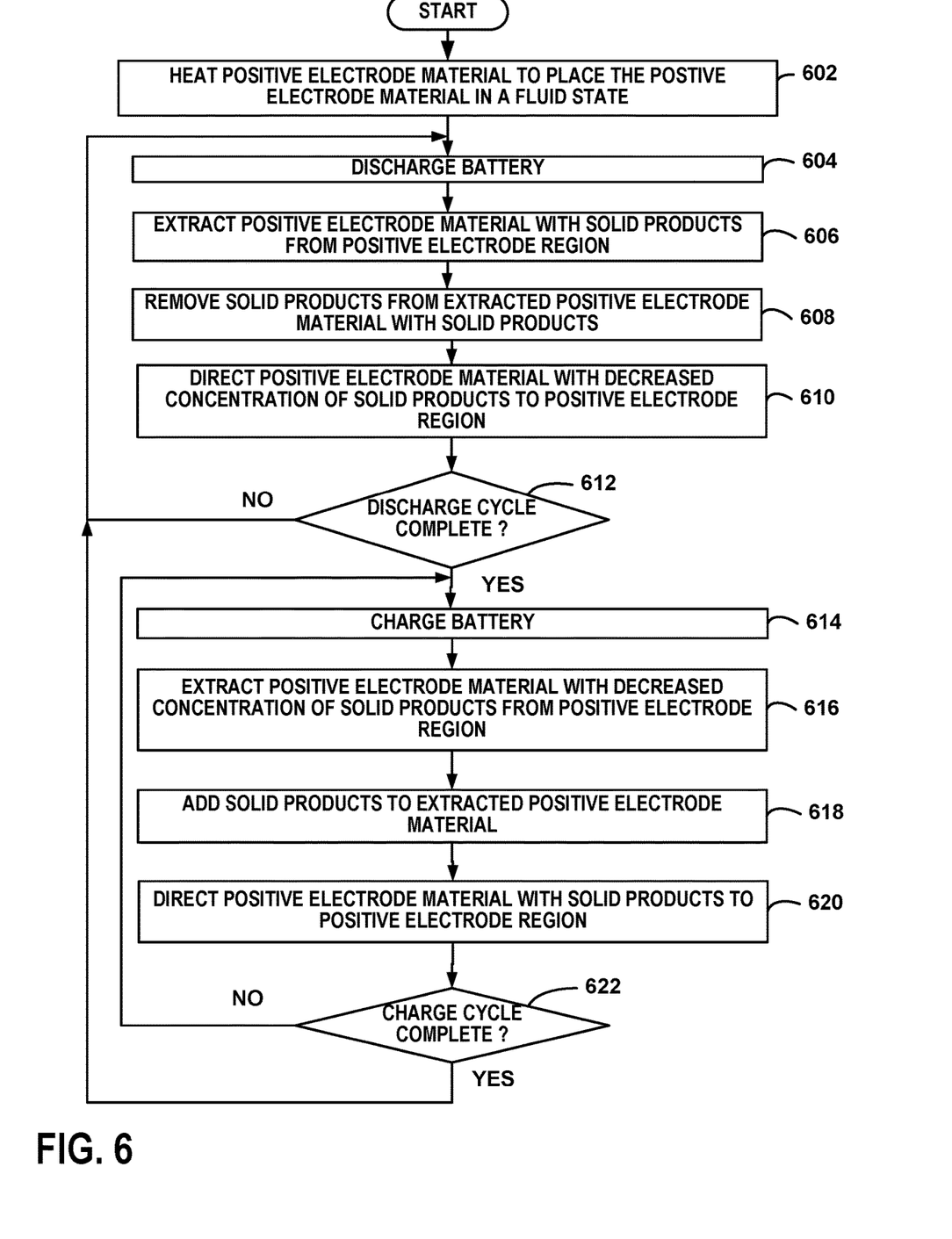
FIG. 6 is a flowchart of an example of a method for isolating solid products in the fluid positive electrode of a thermal battery.

FIG. 6 is a flowchart of an example of a method for isolating solid products in the fluid positive electrode of a thermal battery. The steps of FIG. 6 can be performed in a different order than shown and some steps may be combined into a single step. For example, steps 602, 604, 606, 608 and 610 may be performed simultaneously in some circumstances. Additional steps may be performed and some steps may be omitted in some circumstances. Although the method may be performed in any apparatus having the appropriate structure, components and materials, the example discussed with reference to FIG. 6 is performed in a thermal battery, such as battery apparatus 100, battery 200, and battery 300 discussed above.

At step 602, the positive electrode material in the positive electrode region of the thermal battery is heated to place and maintain the positive electrode material in a fluid state. For the examples herein, the positive electrode material is heated to a temperature above the melting point of the positive electrode material but less than the melting point of the solid electrolyte.

At step 604, the battery is discharged. During the discharge cycle, the battery is typically being used to supply electrical energy by connecting an electrical load to the current collectors. As discussed above, solid products form in the fluid positive electrode due to ions of the negative electrode region moving through the electrolyte and reacting with positive electrode material.

At step 606, positive electrode material with solid products is extracted from the positive electrode region. An example of a suitable technique includes using a pump to move the fluid material from the positive electrode region to a solid product filter.

At step 608, at least some of the solid products are removed from the positive electrode material with solid products. A solid product filter is used to remove solid products. As discussed above, an example of a suitable technique includes using a vortex to separate the solid products which are then extracted and stored. Another suitable technique includes using a rotating drum to direct the less dense solid products to the center of the drum where the solid products are extracted and stored. In a third example of another suitable technique, a separation container separates the less dense solid products from the remaining fluid using gravity and the relative densities of the solid products and the fluid material.

At step 610, the positive electrode material with decreased concentrations of solid products is directed to the positive electrode region. After at least some of the solid products are removed from the positive electrode material, the remaining material with decreased concentrations of solid products is returned to the positive electrode region of the reaction chamber of the battery.

At step 612, the method determines whether the battery is still discharging. If the battery is still being discharged, the method returns to step 604. Otherwise, the method continues at step 614 where the battery is charged. At step 614, a potential is applied across the current collectors to reverse ion flow and charge the battery.

At step 616, the positive electrode material with decreased concentration of solid products is extracted from the positive electrode region. As the battery is charged, the solid products in the charged positive electrode material break down. The negative electrode material cations separate from products formed during discharge and move back through the electrolyte to the negative electrode region. Where the battery is a lithium sulfur thermal battery, the lithium cations move back to the negative electrode region and the concentrations of lithium polysulfide species products and the di-lithium sulfide products decrease.

At step 618, the solid products removed from positive electrode material are added to the charged positive electrode material extracted from the positive electrode region. For techniques where the solid products are extracted and stored in separate chamber(s) during the discharge cycle, the solid products are pumped back into the chamber containing the extracted charged positive electrode material.

At step 620, the positive electrode material with solid products is directed back to the positive electrode region. An example of a suitable technique includes pumping the material into the positive electrode region using a pump.

At step 622, it is determined whether the charging cycle is complete. If the charging cycle is complete the method returns to step 604. Otherwise, the method returns to step 614.

Therefore, the methods, devices, and systems discussed above isolate solid products formed in devices, such as thermal batteries during discharge. The various examples can be modified to include additional features and to use additional mechanisms as well as by substituting other elements that perform similar functions or provide similar results. For example, ultrasonic vibration can be used in another example to facilitate more efficient separation of the solid products from the liquid materials. In addition, techniques discussed with particular examples may be combined to implement other examples. For example, techniques using a vortex 308 can be combined with gravity isolation techniques in some circumstances.

It should be understood, that depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, rather than sequentially or even reversed. In addition, while certain aspects of this disclosure are described as being performed by a single module or component for purposes of clarity, it should be understood that the functions described in this disclosure may be performed by any suitable combination of components or modules associated with a wireless data communication network or system.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:
1. An apparatus comprising:
   a fluid negative electrode comprising a molten negative electrode material, the fluid negative electrode being fluid at least within an operating temperature range of the apparatus;
   a fluid positive electrode comprising a molten positive electrode material, the fluid positive electrode being fluid at least within the operating temperature range of the apparatus;
   a solid electrolyte positioned between the negative fluid electrode and the fluid positive electrode, the solid electrolyte comprising cations of the negative electrode material and in a solid state at least within the operating temperature range of the apparatus; and
   a solid product isolation system configured to decrease, at least within an adjacent electrode region, a concentration of solid products formed within the fluid positive electrode, the adjacent electrode region being within the fluid positive electrode and adjacent to the solid electrolyte.

2. The apparatus of claim 1 wherein the solid product isolation system comprises the fluid positive electrode having a structure and orientation such that a direction of gravity is from the fluid positive electrode to the solid electrolyte.

3. The apparatus of claim 2 wherein the fluid positive electrode is within a positive electrode region of a reaction chamber, the positive electrode region positioned adjacent to the solid electrolyte such that a line extending from any portion of the positive electrode region in a direction of gravity intersects the solid electrolyte.

4. The apparatus of claim 1, wherein the solid product isolation system comprises a solid product filter connected to the fluid positive electrode and configured to extract fluid positive electrode material comprising solid products, to remove at least some of the solid products from the material to produce fluid positive electrode material with decreased concentration of solid products, and to add the fluid positive electrode material with decreased concentration of solid products to the fluid positive electrode.

5. The apparatus of claim 4, wherein, during a charging cycle of the apparatus, the solid product isolation system is configured to:
   extract fluid positive electrode material with decreased concentration of solid products from the fluid positive electrode;
   add solid products to the extracted fluid positive electrode material with decreased concentration of solid products to produce fluid positive electrode material with solid products; and
   add the fluid positive electrode material with solid products to the fluid positive electrode.

6. The apparatus of claim 4, wherein the solid product filter comprises a rotating drum for separating the solid products from the positive electrode material.

7. The apparatus of claim 4, wherein the solid product filter comprises a separation container for separating the solid products from the positive electrode material, the separation container having a structure and orientation such that the solid products float to a top of the separation container, where a direction of gravity is from the top of the separation container to a bottom of the separation container.

8. The apparatus of claim 7, wherein the solid product filter comprises a pump configured to move fluid positive material with decreased concentration of solid products from a lower region of the separation container to the positive electrode region.

9. The apparatus of claim 4, wherein the solid product filter comprises a vortex for separating the solid products from the positive electrode material.

10. The apparatus of claim 9, wherein the solid product filter comprises:
    an outer chamber;

an inner chamber within the outer chamber;
a lateral injector positioned at an inner surface of the inner chamber and configured to inject the fluid positive electrode material extracted from the fluid positive electrode into the inner chamber to rotate contents within the inner chamber to form a vortex separating at least some of the solid products from the fluid positive electrode material by driving the at least some solid products to a center of the vortex;
a solid product extractor positioned near the center of the vortex and configured to move the at least some solid products from the inner chamber to the outer chamber;
a pump configured to move fluid positive material with decreased concentration of solid products from an outer region of the vortex to the positive electrode region.

11. The apparatus of claim 1, wherein the negative fluid electrode comprises lithium, the fluid positive electrode comprises sulfur and the solid products comprise di-lithium sulfide ($Li_2S$).

12. The apparatus of claim 11, wherein fluid positive electrode comprises di-lithium polysulfide species products, $Li_nS_m$ where m and n are integers greater than one.

13. The apparatus of claim 11, wherein the fluid positive electrode further comprises phosphorous (P).

14. The apparatus of claim 1, wherein the negative fluid electrode comprises sodium, the fluid positive electrode comprises sulfur and the solid products comprise di-sodium mono-sulfide ($Na_2S$) and di-sodium di-sulfide ($Na_2S_2$).

15. A thermal battery comprising:
a negative fluid electrode comprising lithium, the lithium being molten and fluid at least within an operating temperature of the apparatus;
a fluid positive electrode comprising sulfur, the sulfur being molten and fluid at least within the operating temperature of the apparatus;
a solid lithium iodide electrolyte positioned between the negative fluid electrode and the fluid positive electrode, the solid lithium iodide electrolyte comprising lithium cations and being solid at least within the operating temperature of the apparatus; and
a solid product isolation system configured to reduce a concentration of di-lithium sulfide ($Li_2S$) at least within an adjacent electrode region within the fluid positive electrode and adjacent to the solid lithium iodide electrolyte.

16. The thermal battery of claim 15 wherein the solid product isolation system comprises the fluid positive electrode having a structure and orientation such that a direction of gravity is from the fluid positive electrode to the solid electrolyte.

17. The thermal battery of claim 15, wherein the solid product isolation system comprises a solid product filter connected to the fluid positive electrode and configured to extract fluid positive electrode material comprising di-lithium sulfide ($Li_2S$) solid products, to remove at least some of the di-lithium sulfide ($Li_2S$) solid products from the material to produce fluid positive electrode material with decreased concentration of di-lithium sulfide ($Li_2S$) solid products, and to add the fluid positive electrode material with decreased concentration of di-lithium sulfide ($Li_2S$) solid products to the fluid positive electrode.

18. The thermal battery of claim 17, wherein, during a charging cycle of the apparatus, the solid product isolation system is configured to;
extract fluid positive electrode material with decreased concentration of di-lithium sulfide ($Li_2S$) solid products from the fluid positive electrode;
add di-lithium sulfide ($Li_2S$) solid products to the extracted fluid positive electrode material with decreased concentration of solid products to produce fluid positive electrode material with solid products; and
add the fluid positive electrode material with di-lithium sulfide ($Li_2S$) solid products to the fluid positive electrode.

19. The thermal battery of claim 18, wherein the solid product filter comprises a vortex for separating the solid products from the positive electrode material.

20. The thermal battery of claim 19, wherein the solid product filter comprises:
an outer chamber;
an inner chamber within the outer chamber;
a lateral injector positioned at an inner surface of the inner chamber and configured to inject the fluid positive electrode material extracted from the fluid positive electrode into the inner chamber to rotate the contents within the inner chamber to form a vortex separating at least some of the solid products from the fluid positive electrode material by driving the at least some solid products to a center of the vortex;
a solid product extractor positioned near the center of the vortex and configured to move the at least some solid products from the inner chamber to the outer chamber;
a pump configured to move fluid positive material with decreased concentration of solid products from an outer region of the vortex to the positive electrode region.

21. A lithium sulfur thermal battery comprising:
a negative fluid electrode comprising lithium, the lithium being molten and fluid at least within an operating temperature of the apparatus;
a fluid positive electrode comprising sulfur, the sulfur being molten and fluid at east within the operating temperature of the apparatus;
a solid lithium iodide electrolyte positioned between the negative fluid electrode and the fluid positive electrode, the solid lithium iodide electrolyte comprising lithium cations and being solid at least within the operating temperature of the apparatus; and
a solid product isolation system configured to reduce a concentration of di-lithium sulfide ($Li_2S$) at least within an adjacent electrode region within the fluid positive electrode and adjacent to the solid lithium iodide electrolyte, the solid product isolation system comprising:
a solid product filter connected to the fluid positive electrode and configured to, during a discharge cycle of the battery, extract fluid positive electrode material comprising di-lithium sulfide ($Li_2S$) solid products from the positive electrode, to remove at least some of the di-lithium sulfide ($Li_2S$) solid products from the material to produce fluid positive electrode material with decreased concentration of di-lithium sulfide ($Li_2S$) solid products, and to add the fluid positive electrode material with decreased concentration of di-lithium sulfide ($Li_2S$) solid products to the fluid positive electrode; and
configured to, during a charge cycle of the battery, extract charged fluid positive electrode material having decreased concentration of di-lithium sulfide ($Li_2S$) solid products from the positive electrode, to add at least some di-lithium sulfide ($Li_2S$) solid products to the material to produce fluid positive electrode material with increased concentration of di-lithium sulfide ($Li_2S$) solid products, and to add the fluid positive electrode material with increased concentration of di-lithium sulfide ($Li_2S$) solid products to the fluid positive electrode.

\* \* \* \* \*